United States Patent [19]
Hinds

[11] 3,827,795
[45] Aug. 6, 1974

[54] SELF-CONTAINED FRONT PROJECTION DISPLAY CABINET

[76] Inventor: Paul B. Hinds, 123 Browncroft Blvd., Rochester, N.Y. 14609

[22] Filed: Apr. 19, 1972

[21] Appl. No.: 245,499

[52] U.S. Cl. .................. 353/77, 353/99, 352/104
[51] Int. Cl. ......................................... G03b 21/28
[58] Field of Search ............ 353/75, 78, 74, 71, 67, 353/97, 77, 78, 98, 99, 119; 350/125; 352/104

[56] References Cited
UNITED STATES PATENTS

| | | | |
|---|---|---|---|
| 2,881,659 | 4/1959 | Eagle | 352/104 |
| 3,225,650 | 12/1965 | Wright | 353/78 |
| 3,535,031 | 10/1970 | Spreitzer | 353/77 |

OTHER PUBLICATIONS

"High–Brightness Projection Screens with Ambient Light Rejection" By J. S. Chandler & J. J. De Palma–Journal of the SMPTE; Oct. 1968; pages 1,012–1,024; Volume 77.

*Primary Examiner*—Louis R. Prince
*Assistant Examiner*—Willis Little
*Attorney, Agent, or Firm*—Schovee & Boston

[57] ABSTRACT

The display cabinet includes a housing, a viewing window in the front of the housing, a front projection "ideal" screen mounted inside the housing and viewable through the window from a selected viewing area in front of the cabinet, a projector mounted in the housing, and a mirror system mounted in the housing for folding the projection beam and impinging it upon the screen at an angle different from that at which ambient light strikes the screen. The screen is "aimed" to position the image light into the selected viewing area and separate from reflected ambient light.

8 Claims, 5 Drawing Figures

SELF-CONTAINED FRONT PROJECTION DISPLAY CABINET

This invention relates to attention-getting displays and more particularly to a self-contained, projection display cabinet using a front projection screen.

Self-contained projection display cabinets using rear projection screens are known. However, such display cabinets are subject to various inherent disadvantages, such as low brightness, poor contrast, and little control over reflected ambient light. It is an object of the present invention to provide a self-contained projection display cabinet that presents an image five or six times brighter than that provided by commonly used medium gain, rear-projection display cabinets, that also avoids the "hot spot" characteristic of rear-projection images, and that provides excellent contrast in color saturation by controlling rejection of room light. While the present invention requires a mirror or projector located somewhat in front of the screen, and while slight keystoning of the image is produced, the advantages of added brightness and contrast far outweigh any disadvantages.

In a preferred embodiment of the present invention, a cabinet housing is provided having modern clean lines with a viewing window at approximately eye level of a standing audience. The cabinet includes an "ideal" screen, a slide projector, and a pair of mirrors for folding a projection beam and directing it upon the screen. The screen aims the projection beam at a predetermined viewing area in front of the cabinet and the second mirror in the folded mirror system blocks and prevents any ambient light from impinging upon the screen at the same angle as does the projection beam.

The present invention will be more fully understood by reference to the following detailed description thereof, when read in conjunction with the attached drawings, wherein like reference numerals refer to like elements, and wherein.

Figure 1:
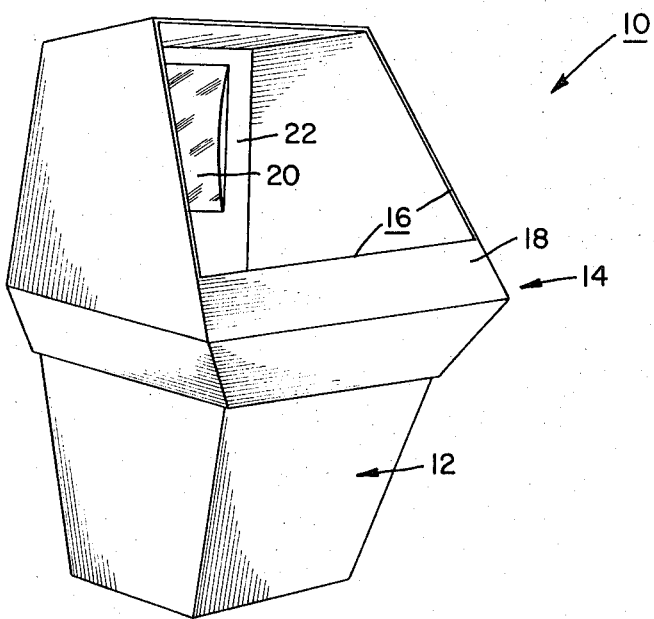
FIG. 1 is a front perspective view of the preferred display cabinet according to this invention.
Figure 2:
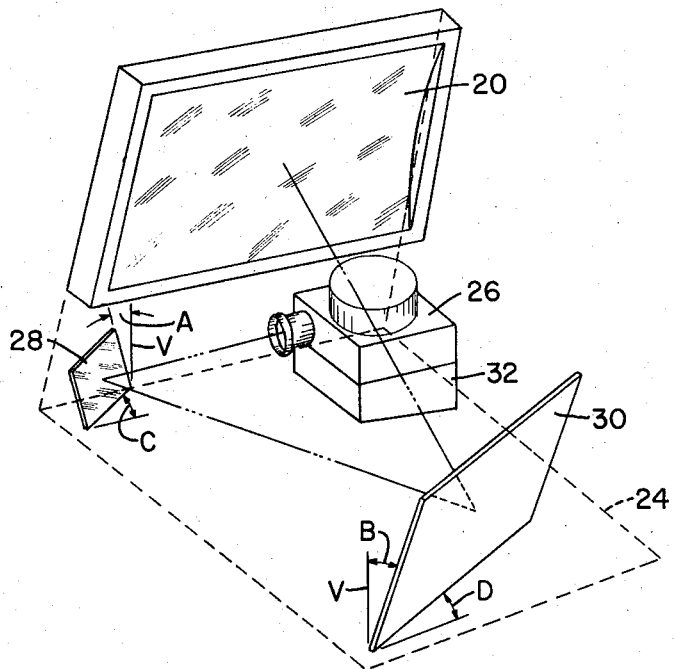
FIG. 2 is a front perspective view of the cabinet of FIG. 1 with the housing removed and showing the screen, projector and mirrors.
Figure 3:
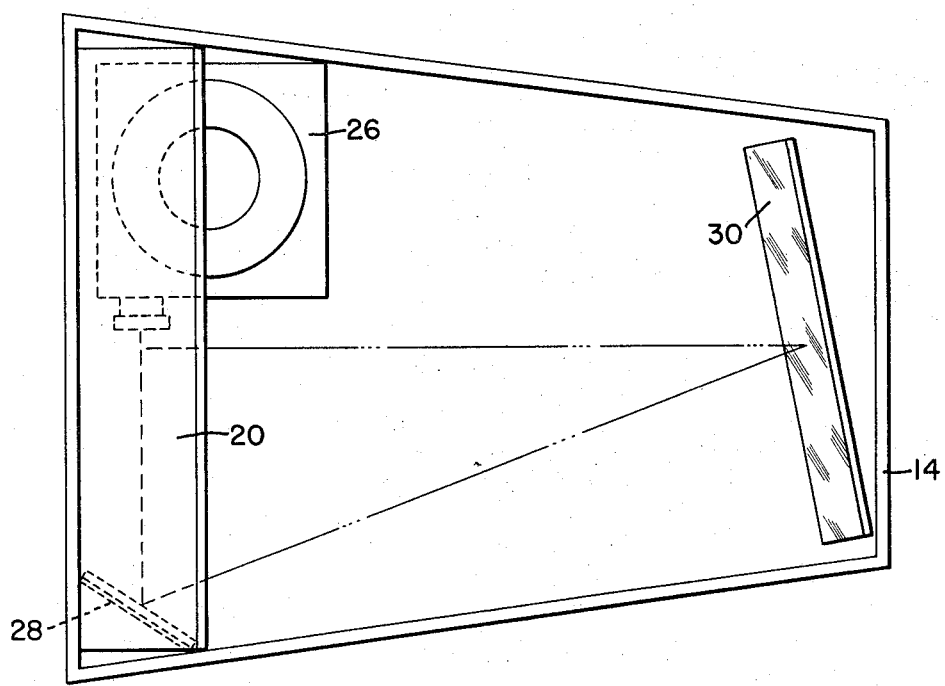
FIG. 3 is a top view of the structure shown in FIG. 2.

With reference now to the drawings, FIGS. 1-3 show a preferred display cabinet 10 according to the present invention. The cabinet 10 includes a base 12, a housing 14 mounted on the base 12, a window 16 in a front wall 18 of the housing 14, an "ideal" screen 20 mounted on a rear wall 22 of the housing and viewable through the window 16 from a viewing area in front of the cabinet 10. Mounted on a floor 24 of the housing 14 is a slide projector 26, a first mirror 28, and a second mirror 30.

Throughout the present specification and claims, the term "ideal" screen is hereby defined to mean a screen that approaches an ideal screen such as is described in the article "High-Brightness Projection Screens With High Ambient Light Rejections" in the October 1968 issue of the Journal of the Society of Motion Picture and Television Engineers, and such as is sold by Eastman Kodak Company under the trademark Kodak Ektalite Projection Screen. As is shown in FIGS. 1 and 2 the screen 20 is curved as described in said article and for reasons obvious to those skilled in the art.

In this preferred embodiment the projector 26 is mounted on a base 32 that is about 3 inches high at the front of the projection and is about 3½ inches high at the rear and thus projects a light beam somewhat down from the horizontal toward the first mirror 28. The projected beam is then reflected to the second mirror 30 and then to the screen 20. Both mirrors 28 and 30 are approximately vertical but are slanted slightly off-vertical. The mirror 28 is slanted back at an angle "A" of about 3½° from the vertical "V" and the mirror 30 is slanted back at an angle "B" of about 14° from the vertical. The mirrors 28 and 30 are also not parallel to the front of the cabinet but are slanted at an angle thereto. The mirror 28 is slanted at an angle "C" of about 54° to the front of the cabinet and the mirror 30 is slanted at an angle "D" of about 11° to the front of the cabinet. The plane with respect to which these latter two angles are taken may be referred to as a vertical plane parallel to the line formed by a horizontal cross-section through the screen 20 (in other words a vertical plane parallel to the front of the cabinet 10). The first mirror is preferably 5 inches × 8 inches, the second mirror 13½ inches × 18 inches, and the screen 18 inches × 25 inches.

Figure 4:
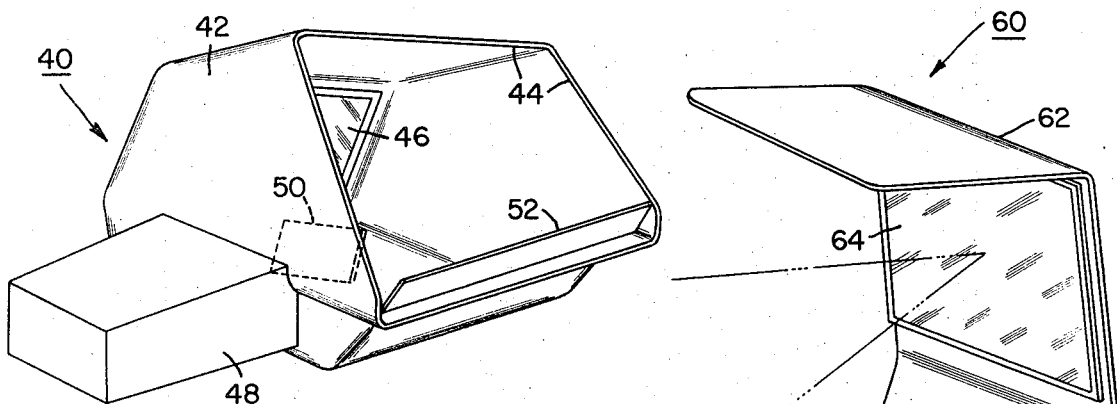
FIG. 4 is a front perspective view of another embodiment of the present invention.

FIG. 4 shows another cabinet 40 including a housing 42, a window 44, a screen 46, a projector 48, a first mirror 50 and a second mirror 52.

Figure 5:
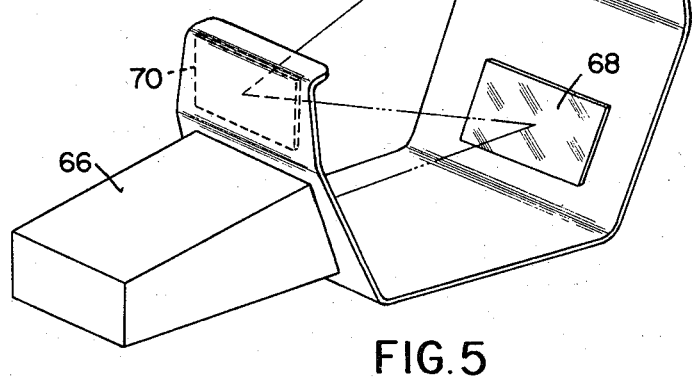
FIG. 5 is a front perspective of still another embodiment of the present invention.

FIG. 5 shows another cabinet 60 including a housing or support 62, a screen 64, a projector 66, a first mirror 68, and a second mirror 70.

Various arrangements of parts can be employed. The housing need not in all applications include walls shielding the screen from ambient light, the projector need not be inside the housing, it can be a movie or a slide projector, and it can be positioned in front of or at the side of the cabinet, but preferably is below the level of the screen, along with the mirrors.

The above-mentioned article shows that by using an "ideal" screen which diffuses the image light in a controlled angle area and that by diffusing little or no image light at other angles outside this area, the image quality of a projected picture can be greatly enhanced. According to the present invention, the following factors are considered when setting up the projection system using an ideal screen: (1) assuring best ambient light control, (2) obtaining the proper angles between the projector, the screen, and the viewers, (3) focusing of the image light at the correct location, (4) minimizing keystoning, and (5) shielding the screen from direct ambient light striking it and surrounding the screen with a dark border.

For a person not versed in projection techniques and optics, optimizing the systems performance is an impossible task. Therefore, the present system which is preconstructed is very desirable. The self-contained projection cabinet 10, for example, which uses mirrors and specifies a position for the projector is an excellent answer; several models have been constructed and tested with excellent results. Models which are open (see FIG. 5) but which control the projection conditions have been constructed as well as "closed" or "sealed" models.

The cabinets of the present invention employ the following design features:

1. To assure that the projection light and the ambient light do not originate from the same angle which would cause them to be diffused at the same angle area, the cabinet is provided with a mirror system to "fold the projection beam" so that the angle at which the projection beam strikes the screen may be controlled and separated from the angle at which ambient light usually originates.

The technique used is to set the final mirror before the screen, below the screen and in front, so that any competing ambient light striking the screen would have to originate from the same direction low in front of the screen. In most situations the general lighting is overhead and thus originates from quite a different angle from the floor and most floors are relatively non-reflective. Further, the final or last mirror (such as mirror 30 in FIG. 2) acts as a shield which would stop any ambient light directed at the screen from exactly the same angle. Circumstances can alter the location of the final mirror, but the basic design concept of separating the angle of projection light from ambient light remains.

This assures that the screen's capability of controlled angles of reflections and diffusion is utilized to keep ambient and image light separate.

2. The screen acts as a spherical mirror and must be "aimed" to place or direct the projected beam (or the image light) into the viewing area. By using a projection cabinet this is automatically done by building in the proper angles between the projection screen, viewing area, and projector. The law of reflection is utilized, and the geometry of placing the screen, mirror system and projector is computed. This is done by "beam folding" which is a technique used in projection calculations whenever mirrors are used. The location of the viewing area varies for different models — wall-hanging models have the projection angle pointing down covering the viewing area in which persons will be looking up at the screen, while table models and pedestal models will have the projected beam nearly parallel to the floor so that persons both standing and seated will be exposed to good image brightness.

3. An "ideal" screen is a curved spherical diffusing mirror and as such has a focal point. Light originating from a point and striking the screen will be focused in an area determined by the relative positions of the screen and projector and by the screen's focal length. By using a mirror system which relays the image light to the screen, the projector location may be specified so as to focus its light in the desired area, thus giving the brightest image in the desired location. This control of the image light may be built into the system by controlling the screen curvature (focal length) and/or the angle of spread at which the image light strikes the screen (usually controlled by the lens focal length). This technique is described in the aforementioned SMPTE paper. In the various models, the location of the light focus varies, but in many models it is set to focus at about infinity so that the image is very bright at a distance and will attract attention for advertising use of the display cabinet.

4. To use front projection and a mirror system, it is usually necessary to keystone the image; i.e., the projection beam is not perpendicular to the screen. Keystoning is a function of three parameters: screen to projector angle, angle of image light spread from the projector, and the height to width ratio of the transparency.

The amount of keystoning is controlled by the position of the mirror which relays the light to the screen and by the projection light spread which is controlled by the lens focal length. The transparency format is controlled by convention — 3:4 height to width ratio for motion picture and 2:3 for 135 slides. In cases where the screen's radius (focal length) can be specified, the keystoning and lens focal length may be determined and the radius of the screen can be used to determine the location of the brightest image. When the screen radius is fixed, there must be a compromise between the keystoning and the focus of the image light since both are functions of the lens focal length. In models with the light focused near infinity, I have determined an angle of keystoning up to 20° is satisfactory, when the parameters are a 2:3 height to width ratio and a 4-inch focal length lens with a slide projector or with a 3:4 height to width ratio of movies and the super 8 format and a focal length of 18 mm.

5. The area around the screen is kept dark by using non-reflective finishes which will not reflect ambient light onto the screen at angles which would degrade the image. In cases where the images are to be viewed in areas of high ambient light, a hood around the screen will help protect it from direct ambient light and will require a viewer's eye to move through a dark area when comparing the image and other objects in the field of view. This dark surround enhances the image by making it appear brighter.

Known "ideal" front projection screens provide brilliant images with good color, sharpness, and rich dark colors and blacks that are five or six times brighter than commonly used medium gain rear-projection screen materials. Because of this, the image in the present invention is bright and attention-getting in most indoor and even in some outdoor conditions when projected images have not been practical before. Further, the screen can provide rich, saturated colors and solid blacks, because of the control and rejection of room light. Some steps in designing a self-contained projection cabinet with an "ideal" screen are as set forth in the following paragraphs.

Select the image height desired, and from this calculate the screen width. For 135 horizontal slides, multiply the desired height by 1.4 to obtain the width; for movies, multiply by 1.25. These ratios are slightly lower than usually used because by filling the screen height the sides overspill, permitting the masking of the image edges (as in most commercial entertainment theaters) to "square up" the sides of the image.

The slightly off-axis projection causes keystoning of the image and is used to reflect the maximum image brightness to viewers, and to reflect ambient light away from them, resulting in excellent image brightness and contrast.

A compromise height:width ratio for both formats is not usually practical. If both formats are used, adjustable black side masks for the screen may be used, or the 1.4 width multiplication factor may be used and the motion picture image may be made slightly larger, to overfill the screen height and thus conceal the keystoning at the sides.

A lens for slide projectors which is often used is the 4-inch lens. This lens assures that the distance to the screen from the projector is far enough away to avoid "hot spotting." The screen is curved to minimize "hot spotting," when a 4-inch or longer focal length lens is used to fill the screen. Equivalent lens focal lengths are 18mm for super 8 or 1¼ inches for 16mm. Use a lens near or somewhat longer than these focal lengths when possible. The longer focal length lenses also minimize the keystoning. The amount of keystoning is inversely proportional to the lens focal length.

Once the screen size, image size and lens focal length have been decided, the projection distance is determined. Often the simplest method is to project the material to be shown, using the same projector and lens, and measure the projection distance for the image height required. Alternatively, use the formula:

$$T = f(H/h + 2)$$

in which:
T = projection distance
$f$ = lens focal length
H = image height
$h$ = projector aperture height All dimensions are in the same terms. Inches are suggested, in which case $h = 0.284$ (16mm movies); 0.158 (s-8 movies); 0.677 (filmstrip); 0.902 (horizontal 135 slides).

This formula yields the projection distance from the projector gate (film position) to the screen image. Kodak Pamphlet No. S-70-8-1, "External Dimensions of Kodak Slide and Motion Picture Projectors," gives the gate locations and permits making a scale drawing of Kodak projectors plus the projection beam. This drawing can be cut out, and is used to find mirror locations, size, and projector locations.

See Kodak Pamphlet No. S-29, "Rear-Projection Cabinets," for the general procedure to use. With front projection, mark a tentative screen line at right angles to the beam center, and draw parallel lines beyond the screen position far enough to equal at least the cabinet depth. This extension of the beam can be used to represent viewing positions. Fold the beam to give mirror position(s) and the screen position.

Light from the ceiling is preferably reflected down into the cabinet and absorbed. The inside of the cabinet should be painted flat black to absorb all stray light which shines into the cabinet.

There are, of course, endless combinations of screen, mirror angles and projector positions, however, three points should be kept in mind:

1. The projected light and ambient light should reach the screen from angles as widely separated as possible.

2. Each mirror reverses the image, i.e., for front projection one mirror reverses it, a second corrects it, and a third reverses it again. A reverse image may be corrected by reversing slides in the projector, but this is not possible in most motion picture projectors (thus while two mirrors have been shown in the drawings, any number can be used).

3. Check to make sure the image has not been inverted over, i.e., the beam at the bottom as it leaves the projector lens should be on the bottom of the screen. (This also can be corrected by reorienting slides, but not with motion pictures.)

The invention has been described in detail with particular reference to the preferred embodiment thereof, but it will be understood that variations and modifications can be effected within the spirit and scope of the invention as described thereinabove and as defined in the appended claims.

I claim:

1. A self-contained front projection display cabinet comprising:
   a. a cabinet housing having a front wall and a rear wall, said front wall having a viewing window therethrough adjacent the top of the front wall of said cabinet housing;
   b. an "ideal" front projection screen located inside said housing adjacent the top of the rear wall of said cabinet housing, said screen being approximately in a vertical plane and being located with respect to said window for viewing through said window by an audience including a plurality of persons;
   c. a projector mounted in said cabinet housing below said screen;
   d. a mirror system mounted in said cabinet housing below said screen for receiving a projection beam from said projector, for folding said beam, and for directing said folded beam onto said screen at an angle such that the image beam reflected from said screen is aimed at a predetermined, limited viewing area in front of said window, said mirror system including a final mirror positioned so as to block any ambient light from being directed to said screen along the same path as that of said projection beam, and said final mirror being positioned in front of and below said screen and adjacent said front wall.

2. The apparatus according to claim 1 wherein said mirror system includes only two mirrors.

3. The apparatus according to claim 1 wherein said housing also includes a top wall, a bottom wall and two side walls, and wherein said front wall, rear wall and side walls extend between and connect said top and bottom walls.

4. A self-contained front projection display cabinet comprising:
   a. a cabinet housing having a front wall and a rear wall, said front wall having a viewing window therethrough adjacent the top of the front wall of said cabinet housing;
   b. an "ideal" front projection screen located inside said housing adjacent the top of the rear wall of said cabinet housing and located with respect to said window for viewing through said window;
   c. a projector mounted in said cabinet housing;
   d. a mirror system mounted in said cabinet housing for receiving a projection beam from said projector, for folding said beam, and for directing said folded beam onto said screen at an angle such that the image beam reflected from said screen is aimed at a predetermined, limited viewing area in front of said window, said mirror system including a final mirror positioned so as to block any ambient light from being directed to said screen along the same path as that of said projection beam, and said final mirror being positioned in front of said screen;
   e. said mirror system including only a first mirror and said final mirror, both mirrors and said projector being located below said screen; and
   f. said screen having a vertical height and a longitudinal width and wherein said projector is positioned to direct a projected beam slightly down from horizontal and approximately parallel to the longitudinal direction of said screen and wherein said mirrors are approximately vertical but are slanted back with their reflecting surface facing slightly upwardly.

5. The apparatus according to claim 4 wherein said housing also includes a top wall, a bottom wall and two side walls, and wherein said front wall, rear wall and side walls extend between and connect said top and bottom walls.

6. The apparatus according to claim 4 wherein said first mirror is slanted back at an angle of about 3½° and said final mirror is slanted back at an angle of about 14°.

7. The apparatus according to claim 6 wherein the plane of each of said mirrors is at an acute angle to a vertical plane parallel to a line formed by a horizontal cross-section through said screen, and wherein the acute angle to said vertical plane is about 36° for said first mirror and is about 11° for said final mirror.

8. The apparatus according to claim 7 wherein said screen forms a spherical arc in vertical cross-section.

* * * * *